Patented May 2, 1944

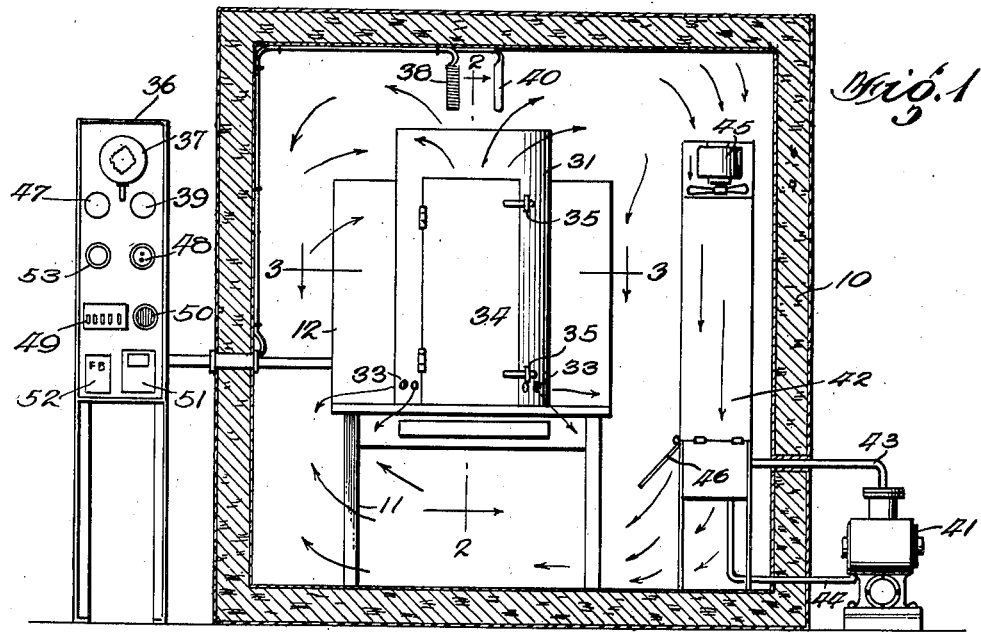
May 2, 1944.  R. A. BUTLAND  2,347,661
HEAT CONDUCTIVITY APPARATUS
Filed Sept. 5, 1941   2 Sheets-Sheet 1
Inventor
Ralph A. Butland
Attorney

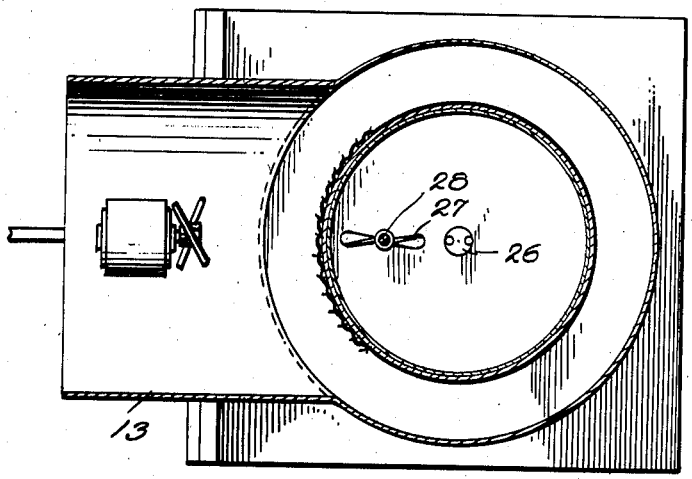
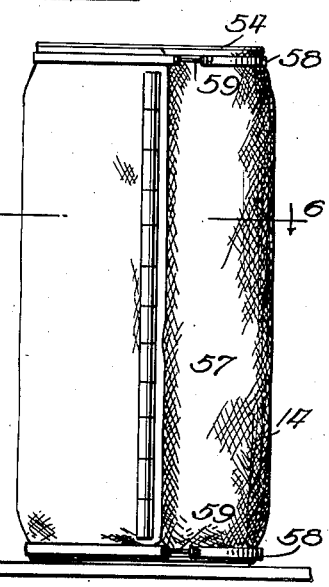
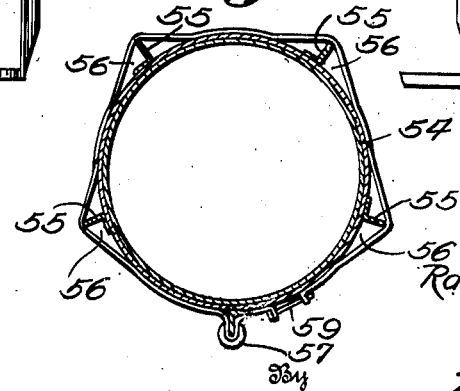
Inventor
Ralph A. Butland

2,347,661

UNITED STATES PATENT OFFICE 2,347,661

HEAT CONDUCTIVITY APPARATUS

Ralph A. Butland, Washington, D. C.

Application September 5, 1941, Serial No. 409,690

2 Claims. (Cl. 73—51)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to an apparatus which can be used to determine the heat conductivity or relative insulation values of textiles or other materials under widely varying conditions simulating climatic temperature, humidity and wind velocity.

In the determination of how much warmer one fabric is than another, a matter of vital concern to the Army having troops in the field under extremely wide ranges of temperature, it is necessary, by suitable thermostatic controls, to maintain body temperature as far as possible, and in order to do this there is provided a cylinder in which agitated warm oil within the cylinder is maintained at a temperature of approximately 98.6° F., corresponding to internal body temperature.

It is, therefore, a fundamental object and purpose of this invention to provide a practical apparatus whereby the difference in warmth between textiles and other materials can be accurately recorded and the variations in the expenditure of electrical energy to maintain the internal warmth of the cylinder between different materials is calculated to show the percentage that one material is warmer than the other. Therefore, this electrical control of the elements within the testing room permits varied types of tests to be made under wide ranges of temperature and humidity for different periods of time and with changed conditions of wind velocity.

Another important object of the invention is to produce an apparatus wherein tests may be conducted, both on uniform types of fabrics, which are subject to cold high winds where the factors of fibre type, texture, textile density and finish are of major importance and on fabric classes which are constructed for use in still air, where the porosity of the textile is great and the insulation value depends in considerable degree upon the capturing of warm air in the porous texture or in the protected position of the material's employment.

Therefore, another important object of the invention is to produce an apparatus that can be operated under extremely adverse temperature conditions, first with sub-zero external temperatures with virtually no humidity and second with tropical external temperatures with a very high relative humidity, thereby simulating tropical conditions. The apparatus itself could be removed from the insulated room and transported to positions in these different climates to make tests, using the actual temperatures and wind conditions for comparisons.

Still another object of the invention is to produce an apparatus whereby the accurate determination of the heat transfer through textiles or other materials is determined through the use of a copper cylinder which is filled with oil or other medium and internally controlled by thermostatic means, to maintain a temperature of approximately 98.6° F., while at the same time the external temperatures in an insulated room in which the copper cylinder is located are accurately controlled from tropical temperatures to sub-zero temperatures and the air surrounding the cylinder on which the textile or other material is placed varies from comparatively motionless to gale intensity.

It is known that there are now in use various apparatus and methods whereby determinations of heat conductivity may be attempted. However, in several of the known apparatus the sample of textile or material tested is of such minute dimensions that the normal variations in texture occurring in manufacturing cannot be compensated for. Therefore, the invention was developed to test large areas of fabric, preferably, but not limited, to rectangular pieces 36 by 40 inches, so that the uneven characteristics normal to weaving, knitting, braiding, spinning, finishing and other processing of textiles, or in the manufacturing of other substances, may be equalized.

Several types of known apparatus are thermostatically controlled and have depended upon the conduction of heat from the controlled heat source, through the textile to cooler temperatures, thereby depending upon the measurement of electrical expenditure and difference in wattage expended to determine the difference in relative warmth.

This invention has been devised, therefore, to permit a new and useful method of determining the warmth of textiles by taking into consideration that clothing does not completely surround the trunk or limbs of the body but drapes itself on the body, permitting air spaces between the body and the textile surrounding it. These air spaces hold captured warm air, which insulate the body and are of major importance in the determination of relative warmth in items of clothing.

In this invention these isolated air spaces are simultated by mechanical means, the material having alternate contacts in certain types of tests between the circumference of the copper cylinder and metal fins, thereby establishing air spaces that are similar to those prevalent when the clothing is worn by an individual. This constancy in the size and extent of the air spaces, being the same size when different materials are tested, equalizes the insulation value of air spaces between fabrics and makes for accuracy in the heat conductivity tests.

The apparatus can realistically simulate a cold, warm, dry or wet wind blowing against the limbs or trunks of an individual. Therefore, there is provided an apparatus which may be used in the simplest routine testing as well as in a most complex series of tests, either in an insulated room or at widely separated places, and introducing wide variables in air motion, external temperature and humidity.

The accomplishment of the above and other related objects is embodied in the forms illustrated in the accompanying drawings, wherein the invention is shown consisting of features of construction, arrangement and application of parts, which will appear in the specification and be finally pointed out in the claims, and while the preferred embodiment of the invention is shown it will be understood that slight changes in form and minor details of construction may be resorted to without departing from the spirit of the invention.

Referring now to the drawings in which similar characters and references in the several figures indicate identical parts:

Fig. 1 is a front elevation of the preferred form of the invention, with an insulated room shown in section.

Fig. 2 is an enlarged longitudinal section of the preferred form of the invention, taken on line 2—2 of Fig. 1.

Fig. 3 is a horizontal section taken on line 3—3 of Fig. 1.

Fig. 4 is an elevation of the frame work used when textiles or other materials are being subjected to certain types of tests requiring air spaces.

Fig. 5 is an elevation of the frame work with the textile or other material in place.

Fig. 6 is a horizontal section taken on line 6—6 of Fig. 5.

Reference now being made to the drawings by numeral and more particularly to Figs. 1 to 3 inclusive, in which is shown, by way of example and not as a limitation, one form of the invention, in which the apparatus is shown as a single complete system within an insulated room 10, mounted upon a table 11, adapted to support a backboard 12 through which the air funnel 13 is placed so that variable air velocity can be introduced against the surface of the textile or other material 14 which is adapted to be mounted on a copper cylinder 15 which has its exterior painted with black lacquer. The cylinder 15 is closed at both ends by a copper top and bottom 16 in such a manner that depressions 17 are formed at both ends, into which are inserted at both top and bottom cork covers 18, upon which is placed reinforcing material 19. Extending down into the oil filled cylinder is a copper well 20 which is formed as an integral part of the top 16, within this well 20 there is suspended an electronic thermo regulator 21, the bulb of which is surrounded, inside the well, by any suitable heat conducting medium 22. The stem of the regulator 21 extends upward into an opening 23 within the cork cover 18 and electrical connections 24 enter into the top cover through an insulator 25 and are then connected to the regulator 21.

The heating elements 26 within the copper cylinder 15 enter and are supported by the copper cylinder bottom 16 and current is supplied to the heating elements 26 by means of electrical connections 26'. The heating elements heat the oil within the copper cylinder and maintain this oil at a mean temperature of 98.6° F. The oil is adapted to be agitated so that a uniform temperature is maintained on all the external surfaces of the cylinder 15 by an agitating propeller 27 which is adapted to be driven by a shaft 28 which is connected to a motor 29 which is attached to the top reinforcing material 19, current being supplied to the motor 29 by electrical connections 30.

The entire unit as previously described is adapted to be placed within the air control jacket 31, the air funnel 13 previously described is a part of and integral with this jacket 31. The air velocity against the textile or other material is controlled by a variable air velocity fan 32 and the air escaping from the air control jacket 31 is emitted through the open top of the air controlled jacket 31 and through vents 33 at the bottom of the jacket.

Access is gained to the interior of the jacket 31 by means of a hinged door 34 in the front of the air jacket 31. This permits an operator to remove and replace the material to be tested. Conventional latches 35 are used to keep the door in closed position.

It is to be understood that while the foregoing description covers a fixed or stationary apparatus it may well be built of a mobile type or other construction in any suitable manner, so long as it embodies the essential variable air induction air funnel, the jacket surrounding a heated cylinder and the introduction of variable air currents against the surface of a textile or other material underneath which are either alternate contacts with the copper heat radiating cylinder and captured air spaces in one type of test and completely wrapped around the cylinder in the other. It is also to be understood that while there is disclosed a heat conductivity apparatus employing a cylinder painted on its exterior surface with a black lacquer, with ends of copper insulated with cork covers to prevent the escape of heat, at the top and bottom, an electronic thermoregulator inside of a well, a particular type of heating element and propelling means, they are not to be considered as of a limiting nature, as it is within the scope of the invention to provide various metals, materials, shapes, constructions, heat controlling devices, heating elements, different methods of agitating the medium within the cylinder, which action is adapted to provide the most useful and convenient disposition thereof to suit the particular installation and maintain controlled temperatures without departing from the scope of the invention.

The apparatus previously described is controlled by a panel board 36, which is placed outside of the insulated room 10 having thereon a temperature recorder 37 which is connected to a temperature recorder bulb 38 placed over the air controlled jacket 31 within the insulated testing room 10. The thermostat 39 controlling the temperature of the insulated testing room 10 has a compressor control bulb 40 which controls the compressor 41 mounted outside of the testing room 10, alternately starting and stopping this compressor as the temperature rises and falls within the testing room 10 by the ordinary method of refrigeration. In order to accomplish this purpose the compressor 41 circulates the refrigerant through the diffuser 42 within the testing room 10 by connections 43 and 44. There is also shown as a part of the diffuser the usual electric diffuser fan 45 which by its operation forces the air downward through the diffuser and out through hinged doors 46 on the bottom of the diffuser. A specially calibrated watt hour meter 47 registers the expenditure of current required to maintain the temperature within the oil filled cylinder 15. A three heat switch 48 permits a variation in the heat expenditure required inside of the cylinder to meet the different requirements from tropical temperatures to sub-zero temperatures. Electrical switches 49 control the diffuser fan 45, the motor 29, light means within the testing room 10, variable velocity fan 32 and any other electrically controlled means that may be required to maintain the operation of the apparatus. A red pilot light 50 is used as a warning signal to indicate whether the apparatus is in operation or not. A relay 51 cuts the current in and out of the heating element 26 as the mercury column rises and falls between the contacts of the electronic thermoregulator 21, resulting from the temperature rise and fall within the oil filled cylinder 15, preferably within a fraction of a degree. There is also placed on the control panel board a fuse box 52 which controls the electrical equipment to prevent serious damage to the apparatus by a short circuit or other failures in the electrical equipment. A rheostat 53 is used as a resistance to increase and decrease the speed of the propeller motor 29 to produce the most uniform distribution of heat over all external surfaces of the copper cylinder 15. As has already been stated, the panel board 36 is placed on the outside of the testing room 10 to permit a control of the various elements of the apparatus within the testing room and thereby enable the necessary readings and calculations to be made without disturbing the atmospheric conditions within the testing room.

The apparatus previously described discloses one type of test wherein a piece of material is being tested, by completely wrapping the cylinder 15 without the framework shown in Fig. 4. Figs. 4 to 6 inclusive show another method whereby a piece of material can be tested with alternate air spaces underneath. In order to accomplish the purpose in the second method there is provided an air spaced harness 54 having fins 55 thereon, which produces air spaces 56 adapted to simulate the drape of cloth on the body and as previously stated, assists in protecting the body warmth of the individual. Any number of fins may be attached to the harness and arranged either vertically, horizontally, diagonally or otherwise, and the invention is not to be considered as limited to this particular construction, since a fluted cylinder holding the heating medium would provide the alternate contacts and captured air spaces and still lie within the scope of the invention.

During this particular type of test the air space harness is placed over and surrounds the oil filled copper cylinder 15 and the textile or other material 14 to be tested is wrapped around the air space harness 54 and oil filled cylinder 15 under suitable tension and the ends thereof are clipped to one of the fins 55 by suitable clips 57. The textile is finally compressed against the top and bottom covers 19 of the cylinder 15 with metal bands 58, which are provided with suitable tightening device 59. As stated, this can be accomplished by opening the air controlled jacket door 34 which can then be closed and retained in closed position by latches 35.

In this manner the fins 55 of the air space harness 54 can be so arranged that air currents impinging upon the surface of the textile or other material, can simulate a freezing wind forcing the material against a warm skin surface, the material rapidly conducting away the bodily warmth, and the difference in the thermal conductivity between fabrics determines the true insulation value of the material.

While there have been described two types of tests wherein a single layer of cloth is wrapped completely around the heated cylinder as shown in Fig. 3 and a single layer of cloth around the air space harness as shown in Figs. 4, 5 and 6, it is within the scope of the invention to wrap two or more layers of cloth either around the cylinder or over the air space harness, or one layer around the cylinder, adjusting the air space harness and adding one or more layers, over the air space harness, in order to simulate one or more external uniform fabrics and a lighter underwear or undergarment fabric, so as to determine the relative warmth of a combination of two or more fabrics. It is likewise within the scope of the invention to place a second harness over the cloth wrapped around the first harness, in order to have an additional set of air spaces which would further simulate the normal drape of fabrics in external garments, underwear, shirts, etc.

The fins may also be attached to the surface of the heated cylinder in any suitable manner other than being attached to the air space harness, such as by sliding the fins into slots in the surface of the cylinder or adapting the fins to pins or slots on the reinforcing of the top and bottom covers.

It will be understood, therefore, by those skilled in the art, that the several embodiments of the invention herein disclosed accomplish the principal object of the invention. It also has uses and advantages other than those herein particularly referred to. Also, that various other changes and modifications than those already pointed out may be made without departing from the spirit of the invention and since the embodiments disclosed herein, being only illustrative of the device, the invention is not to be understood as restricted thereto, since these may be modified within the scope of the appended claims without departing from the spirit and scope of the invention.

Having thus described the invention, what is claimed as new and desired to secure by Letters Patent is:

1. Apparatus for testing the heat conductivity of textiles comprising an insulated chamber, a metal cylinder containing a fluid medium inside said chamber and spaced from the walls thereof, means for heating said fluid medium, means responsive to the temperature inside the cylinder for controlling the energy supplied to the heating means to maintain the temperature inside the cylinder at a constant temperature, means for controlling the temperature inside of the insulated chamber, a fan for circulating air within the chamber at a selected velocity, said cylinder being adapted to have a textile to be tested wrapped about the same, and means to measure the energy supplied to the means for heating the fluid medium to maintain the inside of the cylinder at a constant tempertaure as an index of the heat conductivity of the textile under test.

2. Apparatus for testing the heat conductivity of textiles comprising an insulated chamber, a container of heat conducting material containing a fluid medium inside said chamber and spaced from the walls thereof, means for heating said fluid medium, means responsive to the temperature inside the container for controlling the energy supplied to the heating means to maintain the temperature inside the container at a constant temperature, means for controlling the temperature inside of the insulated chamber, a fan for circulating air within the chamber at a selected veloctiy, said container being adapted to have a textile to be tested wrapped about the same, and means to measure the energy supplied to the means for heating the fluid medium to maintain the inside of the container at a constant temperature as an index of the heat conductivity of the textile under test.

RALPH A. BUTLAND